United States Patent
Ramanathan et al.

(10) Patent No.: US 11,625,257 B2
(45) Date of Patent: Apr. 11, 2023

(54) PROVISIONING EXECUTABLE MANAGED OBJECTS OF A VIRTUALIZED COMPUTING ENVIRONMENT FROM NON-EXECUTABLE MANAGED OBJECTS

(71) Applicant: VMware, Inc., Palo Alto, CA (US)

(72) Inventors: Arunachalam Ramanathan, San Jose, CA (US); Li Zheng, Palo Alto, CA (US); Gabriel Tarasuk-Levin, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 390 days.

(21) Appl. No.: 15/197,552

(22) Filed: Jun. 29, 2016

(65) Prior Publication Data

US 2018/0004555 A1 Jan. 4, 2018

(51) Int. Cl.
*G06F 9/455* (2018.01)

(52) U.S. Cl.
CPC .......... *G06F 9/45558* (2013.01); *G06F 2009/45562* (2013.01); *G06F 2009/45583* (2013.01)

(58) Field of Classification Search
CPC ............... G06F 12/08; G06F 9/45558; G06F 2009/45562; G06F 2009/45583; G06F 2212/657
USPC ................................................. 718/1
See application file for complete search history.

(56) References Cited

U.S. PATENT DOCUMENTS

| | | | | |
|---|---|---|---|---|
| 9,170,831 B2 * | 10/2015 | Robinson | | G06F 9/485 |
| 9,792,131 B1 * | 10/2017 | Uchronski | | G06F 9/455 |
| 2009/0260007 A1 * | 10/2009 | Beaty | | G06F 9/5077 |
| | | | | 718/1 |
| 2011/0113206 A1 * | 5/2011 | Heim | | G06F 9/4418 |
| | | | | 711/162 |
| 2014/0095816 A1 * | 4/2014 | Hsu | | G06F 3/0617 |
| | | | | 711/162 |
| 2014/0237470 A1 * | 8/2014 | Baset | | G06F 9/5033 |
| | | | | 718/1 |
| 2015/0106520 A1 * | 4/2015 | Breitgand | | G06F 9/45558 |
| | | | | 709/226 |
| 2015/0106811 A1 * | 4/2015 | Holler | | G06F 9/45533 |
| | | | | 718/1 |
| 2015/0177997 A1 * | 6/2015 | Warszawski | | G06F 9/45558 |
| | | | | 711/162 |

(Continued)

OTHER PUBLICATIONS

Shi et al. "A cloud service cache system based on memory template of virtual machine", In 2011 Sixth Annual Chinagrid Conference (pp. 168-173). IEEE (Year: 2011).*

(Continued)

*Primary Examiner* — Meng Ai T An
*Assistant Examiner* — Willy W Huaracha
(74) *Attorney, Agent, or Firm* — Dinsmore & Shohl LLP

(57) ABSTRACT

A managed object of a virtualized computing environment, which contains the runtime state of a parent virtual machine (VM) and can be placed in any host of the virtualized computing environment, is used for instantly cloning child VMs off that managed object. The managed object is not an executable object (i.e., the state of the managed object is static) and thus it does not require most of the overhead memory associated with a VM. As a result, this managed object can support instant cloning of VMs with a reduction in memory, storage, and CPU overhead relative to when a parent template VM is used.

11 Claims, 5 Drawing Sheets

(56) References Cited

U.S. PATENT DOCUMENTS

| | | | |
|---|---|---|---|
| 2015/0178107 A1* | 6/2015 | Gummaraju | G06F 9/45558 718/1 |
| 2015/0178108 A1 | 6/2015 | Tarasuk-Levin et al. | |
| 2015/0178109 A1* | 6/2015 | Li | G06F 9/45558 718/1 |
| 2015/0347165 A1* | 12/2015 | Lipchuk | G06F 9/45558 718/1 |
| 2016/0124764 A1* | 5/2016 | Nithrakashyap | G06F 3/0619 718/1 |
| 2016/0364255 A1* | 12/2016 | Chefalas | G06F 8/63 |

OTHER PUBLICATIONS

Shi et al. "A cloud service cache system based on memory template of virtual machine." 2011 Sixth Annual Chinagrid Conference. IEEE, pp. 168-173 (Year: 2011).*

* cited by examiner

PROVISIONING EXECUTABLE MANAGED OBJECTS OF A VIRTUALIZED COMPUTING ENVIRONMENT FROM NON-EXECUTABLE MANAGED OBJECTS

BACKGROUND

In a virtualized computing environment, a plurality of host computers ("hosts") are configured with virtualization software that supports an execution environment for virtual computing instances, such as virtual machines ("VMs"). In a typical implementation, the VMs are directly managed objects of the virtualized computing environment. Some examples of direct management of the VMs include provisioning, cloning, powering on and off, and migrating.

VMs may be provisioned one at a time or multiple VMs may be provisioned from a template VM. U.S. patent application Ser. No. 14/136,661, entitled "Fast Instantiation of Virtual Machines" and filed Dec. 20, 2013, Publication No. 2015/0178108 published on Jun. 25, 2015, the entire contents of which are incorporated by reference herein, describes one such technique for cloning from a template VM. In this technique, referred to as "instant cloning" or "VMFork," the parent template VM is stunned and passes all of its runtime state to a child VM, and the child VM is instantiated using the runtime state of the parent template VM without reboot and continues running from the point in time at which the parent template VM was stunned.

It should be recognized, however, that the parent template VM when powered-on requires overhead memory and its own set of disks for virtualization just like any other VM. The total amount of the required overhead memory is not trivial and in cases where the parent template VM is powered-on across multiple hosts in a cluster, e.g., to be used to instantly clone VMs across the cluster, the memory commitment can be quite significant.

SUMMARY

One or more embodiments provide a managed object of a virtualized computing environment, wherein the managed object contains the runtime state of a parent VM and can be placed in any host of the virtualized computing environment so that VMs can be instantly cloned off that managed object. The managed object is not an executable object (i.e., the state of the managed object is static) and thus it does not require most of the overhead memory associated with a VM. As a result, this managed object can support instant cloning of VMs with a reduction in memory, storage, and CPU overhead relative to when a parent template VM is used.

A method according to an embodiment includes the steps of suspending execution of a first executable object (e.g., a running parent VM), and while suspended, capturing a snapshot of a runtime state of the first executable object, creating a non-executable object from the captured snapshot, wherein the non-executable object is an object of the virtualized computing environment that is separately managed from the first executable object, and provisioning a second executable object (e.g., a child VM) from the non-executable object to restore the runtime state of the first executable object in the second executable object.

Further embodiments include a non-transitory computer-readable storage medium storing instructions that, when executed by a computer system, cause the computer system to perform the method set forth above, and a computer system programmed to carry out the method set forth above.

DETAILED DESCRIPTION

Figure 1:
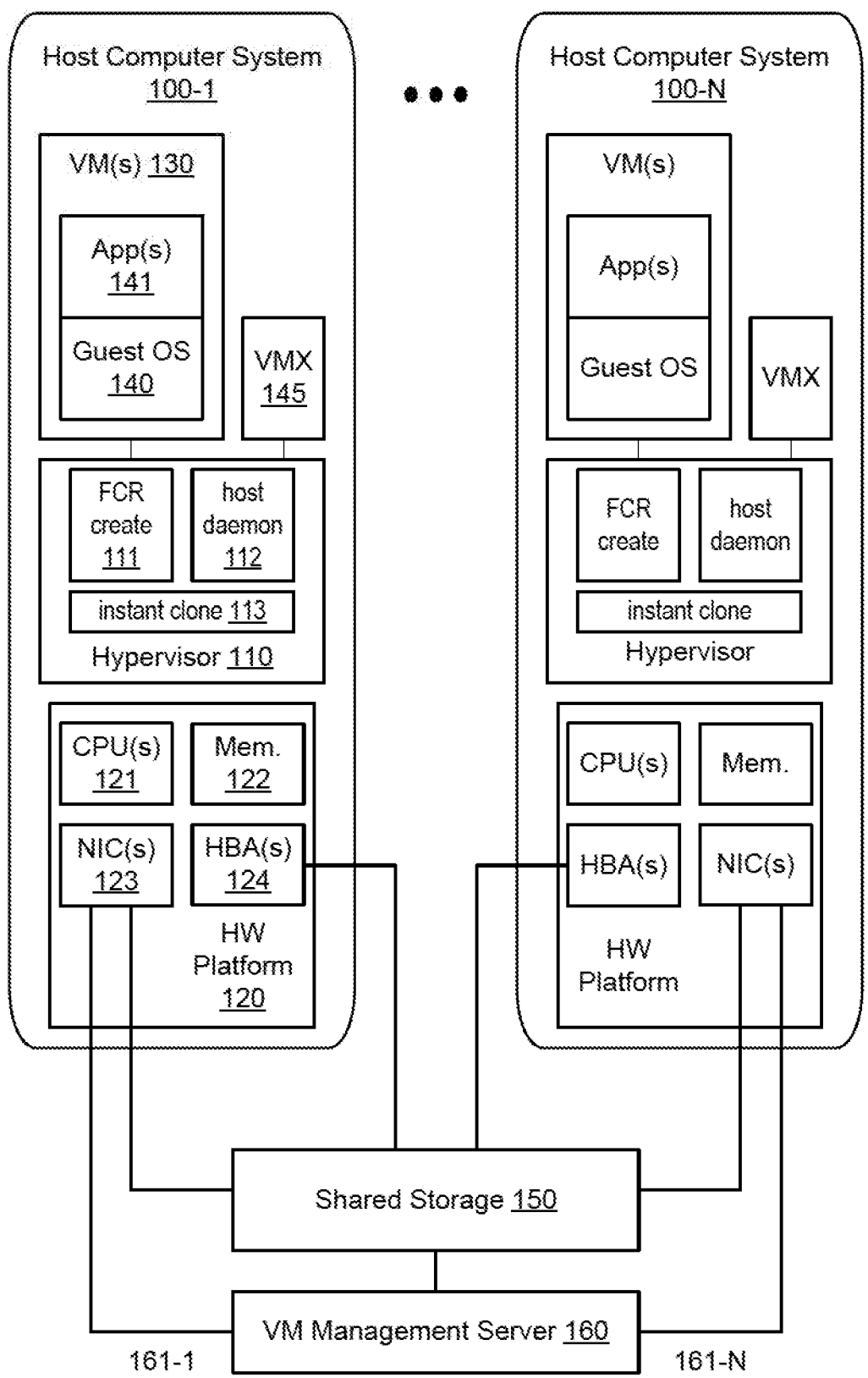
FIG. 1 is a block diagram of a virtualized computing environment in which embodiments may be implemented.

FIG. 1 is a block diagram of a virtualized computing environment in which embodiments may be implemented. The virtualized computing environment of FIG. 1 includes a cluster of host computer systems (or hosts) 100-1 to 100-N, where N is 1 or more. In one embodiment, the hardware configuration of host computer systems 100-1 to 100-N is substantially the same and the configuration of host computer system 100-1 is described herein. Host computer system 100-1 has a hardware platform 120 that includes one or more central processing units (CPUs) 121, system memory 122 (typically volatile dynamic random access memory), one or more network interface controllers (NICs) 123, and one or more host bus adapters (HBAs) 124. In addition, a hypervisor 110 is installed in host computer system 100-1 as virtualization software to support the execution of virtual machines (VMs) 130.

After instantiation, each VM 130 implements a virtual hardware platform in a corresponding virtual machine monitor (VMM) (not shown) that supports the installation of a guest operating system (OS) 140, and guest OS 140 supports running of applications 141 within VM 130. Guest OS 140 may be any of the well-known commodity operating systems, such as Microsoft Windows®, Linux®, and the like.

A VM management server 160 communicates with the hypervisors through a management channel 161-1 to 161-N to perform management operations on VMs 130 and other managed objects, and provisions persistent data stores in shared storage 150, in which virtual disks of VMs 130 are maintained. In the example illustrated in FIG. 1, shared storage 150 is accessed from the hosts through their HBAs. In another example, data stores are provisioned in shared storage, e.g., in network-attached storage (NAS), that is accessed over the network. In such situations, the data stores are accessed from the hosts through their NICs. In some embodiments, persistent data stores are provisioned locally in each host 100.

According to embodiments, managed objects, also referred to as "first class" objects, are directly managed objects of the virtualized computing environment. VMs are one example of managed object according to embodiments. Some examples of direct management of the VMs include provisioning, cloning, powering on and off, and migrating. There may be other managed objects including those that are not executable. According to embodiments, the runtime state of a VM is encapsulated in one such type of non-executable managed object, referred to herein as a "first class runtime" (or FCR for short) object. Runtime state of a VM is defined as the state required to resume the VM execution from the last snapshot of the VM with memory. It comprises of the VM's configuration, device checkpoint, memory, and disk information. After encapsulation, the FCR object is no longer tied to the VM's lifecycle. It can be directly managed, e.g., provisioned and migrated, independent of the VM's lifecycle.

Each FCR object contains enough information to instantiate VMs from it. The properties of an FCR object includes, a universal unique identifier (UUID), hardware configuration information, disk information, a list of hosts into which the FCR object is loaded, a list of data stores to which the FCR object has been persisted, and information on the cluster that is associated with the FCR object.

The FCR object has many similarities with a VM in its lifecycle management even though it is not an executable object. Each host can enumerate FCR objects that are in its memory and each data store can enumerate FCR objects that are persisted therein. If an FCR object is not available on a host, it can be cloned, migrated to the host, or directly loaded into the host from a persisted image of the FCR object in the data store.

According embodiments, various management operations can be performed on the FCR object using application programming interfaces (APIs). The API, FCR.Load( ), loads an offline FCR object into memory. The API, FCR.Unload( ), unloads an FCR object from memory. The API, FCR.Destroy( ), will unload from memory if necessary and eventually expunge it from storage. The API, FCR.Clone( ), duplicates the FCR object at a new destination, which may be another host or another data store. The API, FCR.Relocate( ), moves the FCR object to a new destination, which may be another host or another data store.

If the FCR object is associated with a cluster, a distributed resource scheduler (DRS) component in VM management server 160 places the FCR object according to an algorithm that considers each of the following as scheduling factors: (i) accessibility—whether the FCR object is accessible to a particular host in the cluster, e.g., whether it is loaded, can be cloned over, or can be loaded from an accessible persistent image of the FCR object; (ii) memory overhead—memory required to be reserved for the FCR object; (iii) the cost of instantiating the FCR object; and (iv) the cost of relocating the FCR object.

It should be recognized that, in a cluster, the FCR object becomes a cluster-level entity. Accordingly, it can be automatically scaled out to multiple hosts and scaled back down when it is no longer needed. Both scale-out and scale-down can be carried out with low memory overhead because no runnable VM is involved. In addition, the scale-out and scale-down process is simplified in that, as will be described below, scale-out just requires copying of the mapped memory pages, and scale-down just requires decrementing the page reference counts.

In the embodiments illustrated herein, where data stores are provisioned in shared storage 150, an FCR object which is persisted in shared storage 150 can be migrated to any host 100 that has access to shared storage 150 by loading the FCR object into system memory 122 of that host from shared storage 150. Thereafter, a VM can be instantiated in that host using the FCR object loaded into system memory 122. In the embodiments where local data stores are used for persisting the FCR object, the FCR object is migrated over a network from a source host to a destination host by copying contents of the FCR object loaded into system memory 122 of the source host to system memory 122 of the destination host, and thereafter, a VM can be instantiated in the destination host using the FCR object copied into system memory 122 of the destination host.

Figure 2:
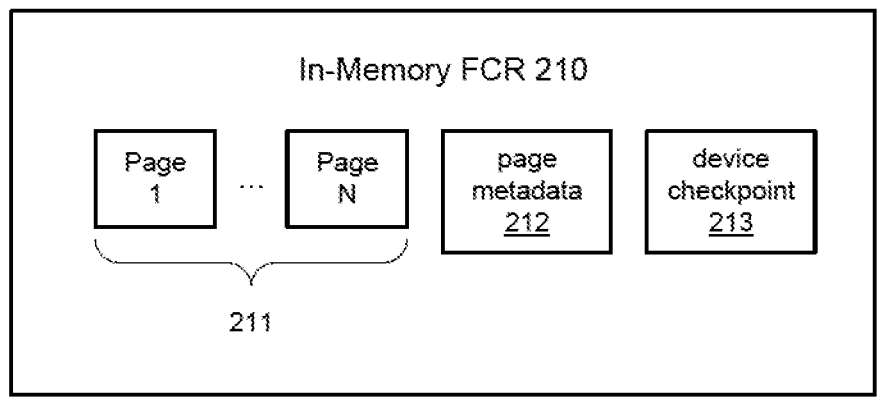
FIG. 2 is a schematic representation of a non-executable managed object that encapsulates a runtime state of a template VM, according to embodiments.
Figure 2:
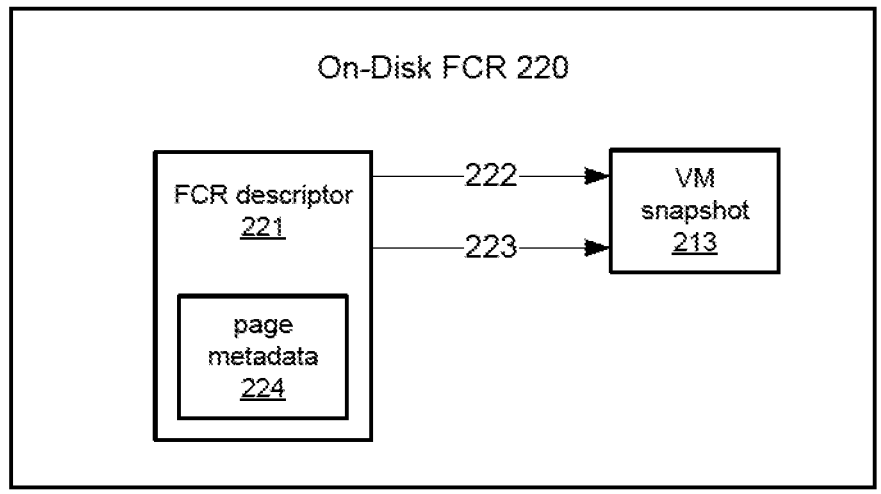

FIG. 2 is a schematic representation of the FCR object. The FCR object is created from a parent VM's runtime state and requires the parent VM to suspend its execution so that the VM's runtime state can be saved. The FCR object is maintained in both memory and on disk. The in-memory copy is used to clone child VMs and the on-disk copy is used to persist the FCR object across host reboots and provision the FCR object to other hosts in the cluster. After creation of the FCR object, the parent VM can either continue executing or power off after the FCR object has been created because the FCR object is not tied to the parent VM's lifecycle.

The in-memory copy 210 of the FCR object includes all the main memory pages of the parent VM's pages, labeled as 211, main memory page metadata 212, and device checkpoint 213. The kernel of hypervisor 110 (hereinafter referred to as the "kernel") employs page sharing to preserve the parent VM's main memory pages outside the parent VM's life cycle. Main memory page metadata 212 is needed to maintain the guest physical page number to machine page number mapping because the kernel relies on this information for page sharing so that the child VM can share the machine pages with the FCR object and properly replicate the runtime state. Device checkpoint 213 is generated by stepping across all virtual devices of the VM, serializing their states, and computing a binary blob from the serialized states. This binary blob is stored as device checkpoint 213.

All of the in-memory state (main memory pages 211) is saved inside the kernel because most of the in-memory state are parent VM's memory pages, which already exist inside the kernel. New kernel memory needs to be allocated only for main memory page metadata 212 and device checkpoint 213. Just as with instant cloning of the related art ("VM-Fork"), the in-memory state helps maintain the same performance while creating child VMs. The difference with the embodiments is that the FCR object takes the place of a full-blown parent VM. Accordingly, instant cloning of the embodiments improves resource utilization, both memory or disk utilization, while still maintaining the performance characteristics of VMFork.

The on disk (persistent) copy 220 of the FCR object includes an FCR descriptor file 221, which contains all the metadata associated with the FCR object. In particular, FCR descriptor file 221 contains a pointer 222 to the parent VM's snapshot's .vmsn file, which contains the parent VM's configuration information, and a pointer 223 to the parent VM's snapshot's .vmem file, which has the contents of the parent VM's main memory. FCR descriptor file 221 also contains main memory page metadata 224 (a persisted copy of in-memory main memory page metadata 212), which identifies pages currently being used and pages currently unmapped. This data would be used if the FCR object is reconstructed in memory.

Figure 3:
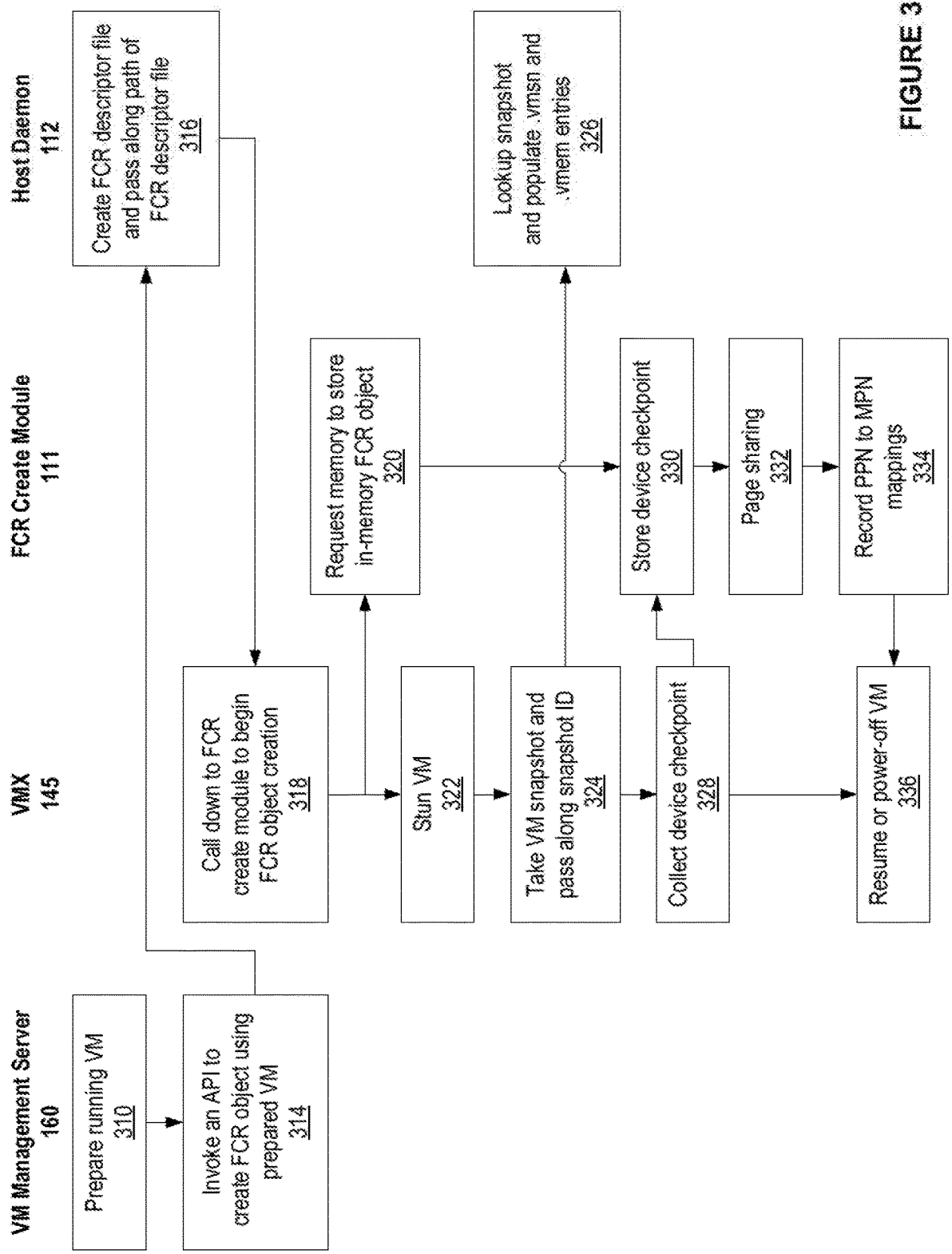
FIG. 3 is a flow diagram of a method of creating the non-executable managed object according to an embodiment.

FIG. 3 is a flow diagram of a method of creating the FCR object according to an embodiment. At step 310, the method begins with a user preparing a running VM with necessary application state. The method may include the steps of provisioning the running VM and powering on the running VM prior to preparing the running VM with the necessary application state. The running VM that is prepared in this manner represents the parent VM whose runtime state is handed off to the child VM during instant cloning. In one embodiment, all of these steps are performed by the user through a user interface that is exposed by VM management server 160.

When the user indicates to VM management server 160 that the parent VM has been prepared with the necessary application state, VM management server 160 at step 314 invokes an application programming interface (API) exposed by hypervisor 110 to create an FCR object using the prepared VM. In response to this API, host daemon 112 at step 316 creates an FCR descriptor file and passes the path to the FCR descriptor file to the parent VM's user world thread, referred to herein as VMX 145. When VMX 145 receives the path to the FCR descriptor file, VMX 145 calls down to FCR create module 111 to begin the process of creating the FCR object both in memory and on-disk. In response to this call, FCR create module 111 at step 320 requests memory allocation from the kernel (using a memory allocation API), to store contents of the FCR object being created in memory.

In addition, VMX 145 stuns the parent VM at step 322, and takes a memory full snapshot of the parent VM, which contains the state of the parent VM's memory, virtual disk, and virtual devices, at step 324. After taking the memory full snapshot, VMX 145 passes the associated snapshot ID to host daemon 112, in response to which host daemon 112 begins populating .vmsn and .vmem entries in the FCR descriptor file at step 326. VMX 145 also collects the device checkpoint (state of the parent VM's virtual devices), and passes it to FCR create module 111 at step 328, which stores the device checkpoint in the memory allocated by the kernel (step 330).

When host daemon 112 receives the snapshot ID, host daemon 112 will instantiate an FCR object complete with all the properties and add this new FCR object to its FCR inventory. This information will also be propagated to VM management server 160, which also maintains the FCR list. In addition, all of the virtual disks associated with the FCR object will be marked as a "first class" disk and will not be changed or deleted during normal virtual machine operations.

After storing the device checkpoint at step 330, FCR create module 111 at step 332 prepares the parent VM to share all its main memory pages, and increases the page sharing reference count for all main memory pages of the parent VM. It should be recognized that page sharing mechanisms implemented herein helps to retain the main memory pages outside the lifecycle of the parent VM. Once the page sharing reference counts of all main memory pages of the parent VM have been increased, FCR create module 111 at step 334 records the main memory page metadata, in particular the physical page number (PPN) to machine page number (MPN) mappings in (i) the memory allocated by the kernel to store contents of the FCR object and (ii) the FCR descriptor file. This metadata is recorded in memory because FCR create module 111 needs to set the child PPNs to the correct MPNs during the instant cloning operation. This metadata is also persisted to disk so that the in-memory state can be reconstructed later. After FCR create module 111 records all the in-memory state, control returns back to VMX 145, which at step 336 either resumes or powers off the parent VM.

FCR create module 111 maintains a list of FCR objects that are available in memory for instant cloning. This list is queried by VM management server 160 to know the state and location of the FCR objects. For certain operations, such as FCR object unload, destroy, and relocate, memory once allocated to the FCR object will need to be reclaimed. The memory reclamation is possible because the FCR object was made a client of the memory scheduler module within the kernel when memory for the FCR object was allocated by invoking the memory allocation API. In addition, when the FCR object unload, destroy, and relocate APIs are invoked, for all the main memory pages of the FCR object that are shared, the page sharing reference count is decremented.

Embodiments employ the memory scheduler module within the kernel for memory allocation of the FCR object and memory reclaiming when the FCR object is no longer needed. Alternative embodiments may employ other techniques of putting the FCR object into memory and removing it when it is no longer needed. One such technique is described in U.S. patent application Ser. No. 13/760,837, entitled "Method of Allocating Referenced Memory Pages from a Free List" and filed Feb. 6, 2013, the entire contents of which are incorporated by reference herein.

Figure 4:
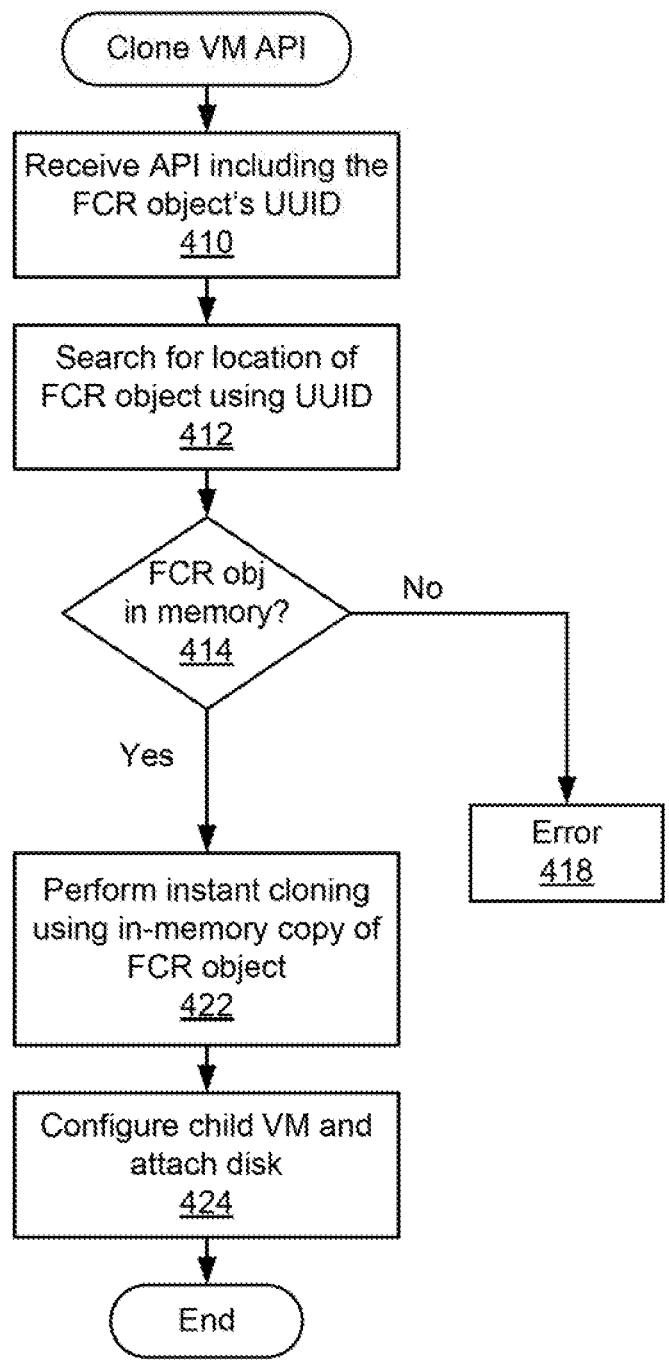
FIG. 4 is a flow diagram of a method of instant cloning a VM from the non-executable managed object according to an embodiment.

FIG. 4 is a flow diagram of a method of instant cloning a VM from the FCR object according to an embodiment. An instant cloning module of hypervisor 110, illustrated in FIG. 1 as "instant clone 113," performs the steps of this method to configure a child VM that will use the FCR object at instantiation. The instant cloning module operates in the same manner as VMFork except that the child VM is cloned off an FCR object and not off a running parent VM.

The method of FIG. 4 begins when an API is invoked to start the instant cloning operation and the instant cloning module at step 410 receives an FCR object's UUID as a parameter of the API. At step 412, the instant cloning module searches for the location of the FCR object, and determines whether the FCR object is in-memory (step 414). If not, the instant cloning module generates an error at step 418. If in-memory, the instant cloning module performs the instant cloning operation at step 422. After step 422, the instant cloning module configures the child VM based on the hardware configuration associated with the FCR object and attaches disk(s) associated with the FCR object to the child VM.

Figure 5:
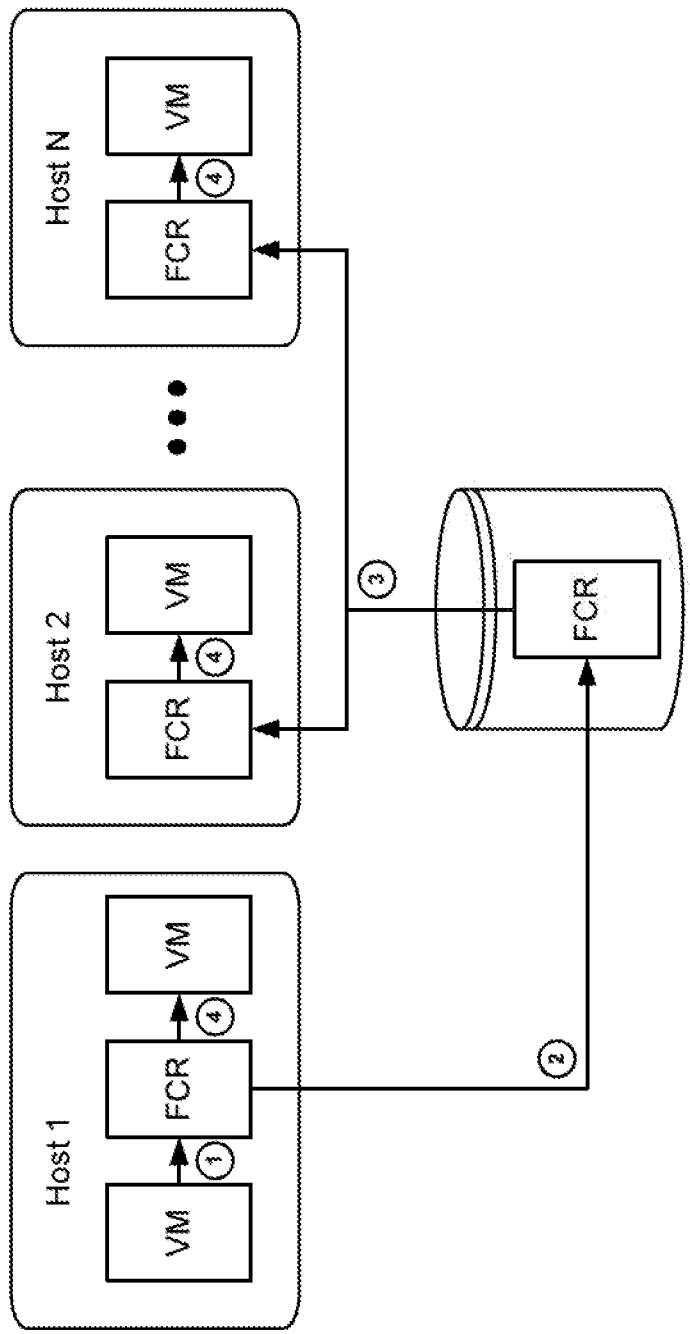
FIG. 5 is a schematic diagram illustrating one example implementation of instant cloning multiple VMs across a cluster of host using the non-executable managed object according to an embodiment.

FIG. 5 is a schematic diagram illustrating one example implementation of instant cloning multiple VMs across a cluster of hosts (hosts 1 to N) using the non-executable managed object according to an embodiment. The ordered steps of the instant cloning operation across a cluster of hosts are depicted in FIG. 5 as 1, 2, 3, 4. Step 1 represents the creation of the FCR object in memory of host 1. Step 2 represents the saving in-memory image of the FCR object on-disk so that it can be loaded into memory of other hosts in the cluster. Step 3 represents the loading into memory. Step 4 represents the instant cloning of child VMs in each host off the FCR object that has been loaded into the memory thereof.

In an alternative implementation for instant cloning multiple VMs across a cluster of hosts using the FCR object, step 3 in the method depicted in FIG. 5 is replaced with the step of sending the in-memory copy of the FCR object across the network to other hosts in the cluster.

The instant cloning according to embodiments yields savings in memory usage because after creation of the FCR object from a parent VM, the parent VM is no longer needed and can be powered off. As a result, there is no memory overhead associated with a running VM. The memory savings is multiplied by the number of hosts in a cluster when instant cloning is carried out across a cluster of hosts.

The instant cloning according to embodiments also yields savings in storage and CPU usage when VMs are cloned across a cluster of hosts from the same image. As to storage savings, only a single copy of the FCR object, which is used to instantly clone the child VM across the cluster, is maintained in storage. By contrast, when parent template VMs are employed for instant cloning, one linked clone will need to be maintained in storage for each host in the cluster. As to CPU usage savings, embodiments no longer require the preparation of a running parent VM at each host in the cluster. Instead, embodiments employ copying the FCR object into each of the hosts, which is considerably cheaper in terms of CPU cycles compared to preparing VMs. Further, every time the host is placed into maintenance mode and subsequently rebooted, the parent template VM needs to be re-prepared. By contrast, embodiments merely require the FCR object to be loaded into memory from the on-disk copy.

Additional advantages are in the management of the objects. Embodiments require only one copy of the FCR object. Therefore, the management stack has only one object to manage compared to managing N objects in the case where instant cloning is being carried out across a cluster of N hosts. For example, when parent template VMs are used for VMFork, each of the N hosts will require a copy of the parent template VM.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., containers of Docker, Inc.). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of provisioning virtual machines from a non-executable object of a plurality of non-executable objects in a virtualized computing environment having two or more host computers coupled to a shared storage, wherein managed objects of the virtualized computing environment are provisioned in the two or more host computers, the managed objects including (a) a plurality of executable objects capable of being executed on a processor of each of the two or more host computers, and (b) the plurality of non-executable objects, wherein a state of each non-executable object is static, further wherein the plurality of executable objects comprise a first virtual machine (VM) loaded into memory of a first host computer of the two or more host computers and executing on the processor of the first host computer, said method comprising:

suspending execution of the first VM, and while suspended, capturing a snapshot of a runtime state of the first VM;

creating an in-memory instance of the non-executable object on the first host computer from the captured snapshot, wherein the in-memory instance of the non-executable object contains the runtime state of the first VM, wherein the in-memory instance of the non-executable object includes a mapping between (a) guest physical memory page numbers of the first VM, and (b) machine memory page numbers of a kernel of the first host computer, and wherein the non-executable object is an object of the virtualized computing environment that is separately managed from the first VM;

provisioning a second VM based on the in-memory instance of the non-executable object, without using any VM on the first host computer other than the second VM, to restore the runtime state of the first VM in the second VM;

creating an on-disk instance of the non-executable object in the shared storage based on the in-memory instance of the non-executable object;

creating a separate in-memory instance of the non-executable object on a second host computer of the two or more host computers based on the on-disk instance of the non-executable object in the shared storage; and provisioning a third VM on the second host computer from the separate in-memory instance of the non-executable object.

2. The method of claim 1, wherein the in-memory instance of the non-executable object is maintained in the memory of the first host computer and memory space allocated to the non-executable object is reclaimable.

3. The method of claim 1, wherein the runtime state of the first VM includes memory pages of the first VM and states of devices of the first VM.

4. The method of claim 1, wherein the second VM is provisioned in the first host computer.

5. A non-transitory computer readable medium comprising instructions, which when executed by two or more host computers coupled to a shared storage, cause the two or more host computers to perform a method of provisioning virtual machines from a non-executable object of a plurality of non-executable objects in a virtualized computing environment, wherein managed objects of the virtualized computing environment are provisioned in the two or more host computers, the managed objects including (a) a plurality of executable objects capable of being executed on a processor of each of the two or more host computers, and (b) the plurality of non-executable objects, wherein a state of each non-executable object is static, further wherein the plurality of executable objects comprise a first virtual machine (VM) loaded into memory of a first host computer of the two or more host computers and executing on the processor of the first host computer, said method comprising:

suspending execution of the first VM, and while suspended, capturing a snapshot of a runtime state of the first VM;

creating an in-memory instance of the non-executable object on the first host computer from the captured snapshot, wherein the in-memory instance of the non-executable object contains the runtime state of the first VM, wherein the in-memory instance of the non-executable object includes a mapping between (a) guest physical memory page numbers of the first VM, and (b) machine memory page numbers of a kernel of the first host computer, and wherein the non-executable object is an object of the virtualized computing environment that is separately managed from the first VM;

provisioning a second VM based on the in-memory instance of the non-executable object, without using any VM on the first host computer other than the second VM, to restore the runtime state of the first VM in the second VM;

creating an on-disk instance of the non-executable object in the shared storage based on the in-memory instance of the non-executable object;

creating a separate in-memory instance of the non-executable object on a second host computer of the two or more host computers based on the on-disk instance of the non-executable object in the shared storage; and provisioning a third VM on the second host computer from the separate in-memory instance of the non-executable object.

6. The non-transitory computer readable medium of claim 5, wherein the in-memory instance of the non-executable object is maintained in the memory of the first host computer and memory space allocated to the non-executable object is reclaimable.

7. The non-transitory computer readable medium of claim 5, wherein the runtime state of the first VM includes memory pages of the first VM and states of devices of the first VM.

8. The non-transitory computer readable medium of claim 5, wherein the second VM is provisioned in the first host computer.

9. A virtualized computing environment comprising a cluster of host computers, including a first host computer and a second host computer coupled to a shared storage, wherein managed objects of the virtualized computing environment are provisioned in the cluster of host computers, the managed objects including (a) a plurality of executable objects capable of being executed on a processor of each of the first and second host computers, and (b) a plurality of non-executable objects, wherein a state of each non-executable object is static, further wherein the plurality of executable objects comprise a first virtual machine (VM) loaded into memory of the first host computer and executing on the processor of the first host computer, the cluster of host computers configured to perform a method of provisioning virtual machines from a non-executable object of the plurality of non-executable objects, said method comprising:

suspending execution of the first VM, and while suspended, capturing a snapshot of a runtime state of the first VM;

creating an in-memory instance of the non-executable object on the first host computer from the captured snapshot, wherein the in-memory instance of the non-executable object contains the runtime state of the first VM, wherein the in-memory instance of the non-executable object includes a mapping between (a) guest physical memory page numbers of the first VM, and (b) machine memory page numbers of a kernel of the first host computer, and wherein the non-executable object is an object of the virtualized computing environment that is separately managed from the first VM;

provisioning a second VM based on the in-memory instance of the non-executable object, without using any VM on the first host computer other than the second VM, to restore the runtime state of the first VM in the second VM;

creating an on-disk instance of the non-executable object in the shared storage based on the in-memory instance of the non-executable object;

creating a separate in-memory instance of the non-executable object on the second host computer based on the on-disk instance of the non-executable object in the shared storage; and provisioning a third VM on the second host computer from the separate in-memory instance of the non-executable object.

10. The virtualized computing environment of claim 9, wherein the runtime state of the first VM includes memory pages of the first VM and states of devices of the first VM.

11. The virtualized computing environment of claim 9, wherein the non-executable object is a cluster-level entity and is managed by a distributed resource scheduler (DRS) component running in a virtual machine management server, the DRS component placing the non-executable object in a particular host computer in the cluster based on: (i) whether an image of the non-executable object is accessible to the particular host computer; (ii) memory required to be reserved for the non-executable object; (iii) computational cost for instantiating the non-executable object; and (iv) computational cost for migrating the non-executable object.

* * * * *